United States Patent [19]

Page et al.

[11] 4,454,580

[45] Jun. 12, 1984

[54] PROGRAM CALL METHOD AND CALL INSTRUCTION EXECUTION APPARATUS

[75] Inventors: Howard L. Page; James A. Wingert, both of Charlotte, N.C.

[73] Assignee: International Business Machines Corporation, Armonk, N.Y.

[21] Appl. No.: 302,932

[22] Filed: Sep. 16, 1981

[51] Int. Cl.³ .............................................. G06F 9/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 4,041,462 | 8/1977 | Davis et al. | 364/200 |
| 4,084,224 | 4/1978 | Appell et al. | 364/200 |
| 4,128,878 | 12/1978 | Yasuhara et al. | 364/200 |
| 4,338,663 | 7/1982 | Strecker et al. | 364/200 |

OTHER PUBLICATIONS

Steven A. Lapham and Harold M. Kop, "The 8086 μP has the architecture to handle high-level languages efficiently"; Electronic Design 5; Mar. 1, 1980; pp. 97–99.
*iAPX 86,88 User's Manual;* Intel Corporation; Aug. 1981; pp. 1-2, 3; 2-7 through 17; 2-43 through 51; and 2-68, 69.

*Primary Examiner*—Raulfe B. Zache
*Attorney, Agent, or Firm*—Karl O. Hesse

[57] ABSTRACT

A computer architecture is disclosed which permits intersegment program calls with associated selective allocation of data segments of varying lengths. The calling program controls selective allocation of segments to the called program but the called program controls the lengths of the segments being allocated. In this way, recursive calls to the same program cannot affect the function or data of other programs or of the same program in a previous call. Also allocation of data segments can be postponed until execution resulting in more flexible execution of programs written without knowledge of the details of other co-executing programs.

5 Claims, 7 Drawing Figures

PROGRAM CALL METHOD AND CALL INSTRUCTION EXECUTION APPARATUS

BACKGROUND OF THE INVENTION

The size of programs written in an assembly level language has in the past been limited by the address range provided by the address fields of the instructions. The address range defined a logical address space in which a main program including all of its subroutines and its data work storage resided.

To overcome the logical address space limitation, application programmers have provided for overlaying portions of the program with other portions of the program read in from an I/O device. Overlay allows the size of the program to exceed the available address space by reusing portions of the address space for different parts of the program in time sequence. Program overlay requires the application writer to preplan the use of logical address space. Program overlay becomes exceedingly complex in large application programs.

As tasks become more complex, there has been a need to provide more logical address space without being concerned about execution sequence.

Another method of accessing more logical address space was provided in the IBM 3600 Finance Communication System wherein circuits were provided which would fetch instructions from one logical address space or segment and would perform data fetches and stores in another logical address space or segment. This method effectively doubles the available address space but neither the program or the data can exceed the original address space size.

An improvement on the above described simple method is provided by the method used by the cross memory feature of the IBM 370 architecture. The cross memory feature of the IBM 370 system adds several instructions (e.g. program call, move primary, program transfer, etc.) which pass program execution across virtual address space or segment boundaries using general purpose registers (GPR) 3 and 14 and control registers 1 and 7. GPR 3 contains the return address space and GPR 14 contains the return instruction counter. Control register 1 contains the segment table pointer for the new address space and control register 7 contains the segment table pointer for the old or calling address space. The cross memory feature allows calls across address space boundaries and data movement across address space boundaries.

More recently, the Intel Corporation has announced a microprocessor system which uses a stack oriented combination of the above described methods. In the Intel Corporation microprocessor, code segment and data segment address spaces are defined by the contents of a special code segment register and a special data segment register. A stack segment register and an extra data segment register are also provided. The content of a segment register is shifted and added by processor circuits to the logical address from a program instruction to create an address in a much larger address space than could be defined by the address fields of the instructions. An address space or segment starts with the address in the segment register and runs for 64K bytes, coextensively with other address spaces that may have been defined by other programs to start at nearby addresses. Each program can execute a move instruction to change the base address in a segment register. An intersegment call instruction is also provided which includes a field for updating the code segment register to pass execution to a program in another address space. In addition to updating the code segment register, the calling program segment base address and the calling program instruction count are pushed onto the stack. When the called program executes an intersegment return, the segment base address and instruction count for the calling program are popped from the stack for continued execution.

The above prior art architectures provide for passing program execution control to program instructions outside of a logical address space but do not effectively provide for data address space management, particularly for reentrant or recursive program execution.

For example, the calling program needs to have a measure of control over whether the called program shall utilize the calling program's address space or a new data address space. On the other hand, the data address space needs of a reentrant or recursively called program are best defined as part of the called program. In the prior art Intel system, the base address of a data address space can be defined either by the calling program or by the called program using a move to segment register command. Because neither program can limit the length of an address space or segment to less than the address range of the address field of an instruction, there is no mechanism to insure that called programs will not write over data stored by another program.

SUMMARY OF THE INVENTION

The invention provides the capability to conveniently pass execution control and data access between programs operating in different logical address spaces or segments, allowing an application to be broken into an arbitrarily large number of programs, or program subroutines, each in a different logical address space or segment of variable length. Each of the programs can be written as if it were the only program to occupy the logical address space. Some of these programs may very well have been previously written for a simple microcomputer where the program address space is limited by a sixteen bit address bus for example.

In an important aspect of the invention, storage is dynamically allocated as part of executing a call, thereby permitting multiple overlapping calls of a reentrant program by one or several calling programs without loss of data or control. For example, if program A calls program B and a task switch occurs before program B returns, program C can also call program B without interfering with the status or function of the program A call of program B. In a recursive example, if program A calls program B which in turn calls program C, program C can again call program B without interfering with the status or function of the program A call of program B.

In a further refinement of the invention, storage can be allocated to a called program from the same storage space which was previously allocated to the calling program. In this way, the called program can access a data address space of the calling program without data movement.

In the preferred embodiment, a microprogram maintains a name list storing the names of each application and its associated program segment base address and segment length. The microprogram also maintains one or more push down stacks which contain the status and the base addresses and length of every segment of all called programs. A separate stack is preferably maintained for each task so that tasks may be completed in a different sequence than they were initiated as determined by the completion of independent I/O operations. A task may, for example, be a virtual computer serving a keyboard-display terminal user.

The programming language is extended to include a call instruction which references the new program segment by program name and specifies whether data address space is to be shared with the calling program or newly allocated from free storage. Fields in the program segment are accessed to determine the length of each new storage segment to be allocated. A corresponding return instruction returns control to the calling program in its own address space.

PREFERRED EMBODIMENT OF THE INVENTION

Figure 1:
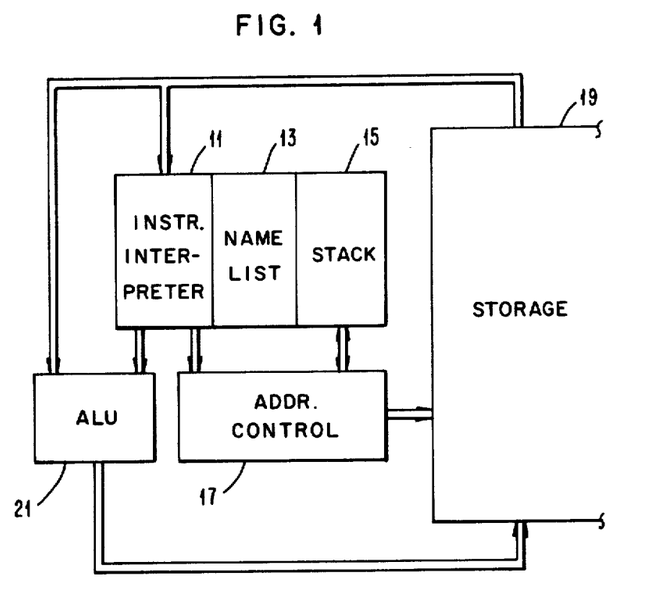
FIG. 1 is a block diagram of a computer showing the name list and stack of the invention in block diagram form.

Referring now to FIG. 1, a block diagram including instruction interpreter 11, name list 13, stack 15, and address control 17 of an example 16 bit computer are shown as they would interact to control addressing of a memory 19 having more storage space than could be addressed by the instruction fields of the program language being executed by the instruction interpreter. Stack 15 preferably includes a separate list or stack for each task or main program in a multiprogrammed environment. A task may for example serve one of a plurality of keyboard display stations. An arithmetic logic unit 21 of the usual construction is shown for completeness. Instruction interpreter 11 receives instructions from memory 19 and controls arithmetic logic unit 21 and address control 17 to address other memory locations in the performance of instruction execution.

Figure 2:
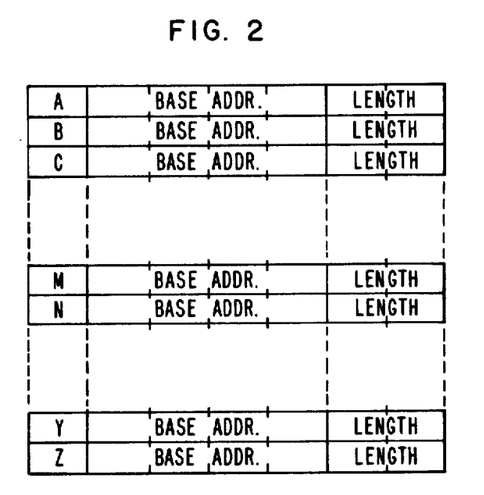
FIG. 2 shows a detailed embodiment of the name list.

FIG. 2 shows the format of the name list of this preferred embodiment. The name list in this embodiment is a 26 word list, each word having a name field, a four byte address space field, and a two byte length field. In our embodiment, the name has been limited for simplicity to a single alphabetic character which can be stored in one byte. In actual practice, a much longer name would be desired.

Figure 3:
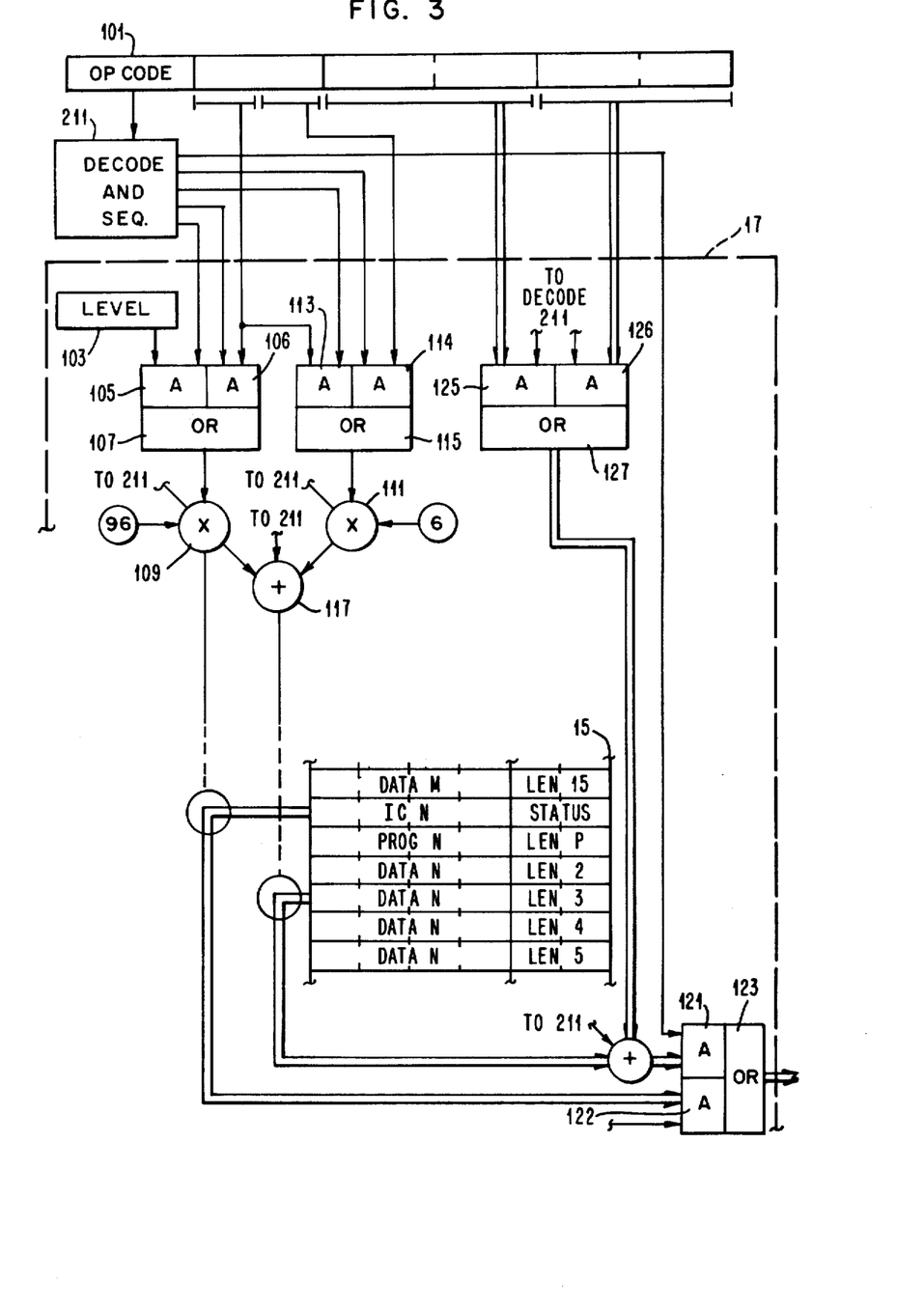
FIG. 3 shows a detailed but simplified logic diagram of part of address control 17 of FIG. 1.

FIG. 3 shows a simple embodiment and method for accessing an address location using the invention while executing a six byte instruction including an eight bit opcode, two four bit fields for logical address space or segment identification and two sixteen bit address fields. Each segment identification field is analogous to the segment override prefix of the prior art Intel Corporation microprocessor. The instruction is stored in instruction register 101 for interpretation and execution. FIG. 3 also shows a portion of stack 15 including the base address and length of the last data segment of the calling program M, the instruction pointer and status bytes for the called program, and the base addresses and lengths of each segment of the called program N. It will be noted that unlike the prior art, stack 15 contains the length of each segment related to a calling program. In this simplified embodiment, the segments for the called program are also placed on the stack and used directly from the stack to calculate each address. Use of the stack obviates the need for a separate set of registers for storing the current base address for each segment.

In addition to the instruction register 101 and the stack 15, FIG. 3 shows decode and sequence execution unit 211 which is part of instruction decode 11.

FIG. 3 also shows a portion of address control unit 17. In order to access the correct entry in stack 15, a call level is combined with the segment number field to access stack 15. The zero level of stack 15 stores the base segment addresses and lengths for the main program for a task. Each time a call is made to another program, the number in level register 103 is incremented. Each return decrements level register 103. Whenever a task switch occurs, the level number in register 103 must also be saved and then switched to correspond to the number of calls which are active in the new task.

AND gate 105 is controlled by decode 211 to pass the contents of level register 103 through OR gate 107 to multiplier 109. Multiplier 109 multiplies the level by 96 which is the number of bytes in each level of stack 15. The output of multiplier 109 is added to the output of multiplier 111. Multiplier 111 multiplies the segment number from the instruction which is received through gates 113, 115 under control of decode 211 by the constant six because each entry in stack 15 comprises six bytes. Adder 117 therefore has an input connected to multipliers 109 and 111 to generate a sum which identifies the first byte of the stack entry desired. In the example of FIG. 3, the stack entry desired is the data address space or segment 2. If the stack is stored in memory, the output of adder 117 is in turn added with a base stack address to obtain an actual address for accessing the data entry as shown in FIG. 3. Having accessed the correct stack entry, the four byte base address stored in the stack entry is added to the sixteen bit address field of the instruction by adder 119 to obtain the address. The address is gated out through AND gate 121 to access storage, either directly or through storage management logic which permits a limited amount of real storage to serve as a much larger virtual store.

The second operand is obtained in the same way using gates 114, 115, 126, 127 to generate a second address using the second segment field and second address field.

Having described the operation of address control 17 using a stack 15, the operation of instruction interpreter 11 executing the call instruction of FIG. 4A to place entries into a stack 15 using name list 13 will now be described. Referring to FIG. 5, a four byte call instruction of the invention is shown in instruction register 101. Again, the first byte of this instruction is the opcode which in this example operates to allocate data storage segments to a new application program in a new program segment and transfer execution control to the new program. Associated with each call instruction is the name of the new program being called. In this example, a single alphabetic character name has been assumed and therefore the name field need only be one byte long.

The second byte of the call instruction is the one byte name field. The third and fourth bytes of the call instruction are the space allocation bytes. The content of the space allocation bytes is bit significant. That is, the existence of a binary one in a bit position indicates that the corresponding numbered segment is to be newly allocated from free memory. A binary zero in a bit position indicates that the corresponding numbered address space for the program being called is to be the same as the corresponding numbered segment of the calling program.

Referring again to FIG. 5, the opcode portion of the call instruction in instruction register 101 is decoded to activate the sequence of execution controlled by decode 211. The first step in the sequence of execution of a call instruction is to increment the instruction count by four bytes. In this way the next instruction of the calling program is available upon return from the called program. Next, an output from decode 211 increments the value in level register 103. Multiplier 109 is again controlled by decode 211 to locate the first entry of the newly allocated stack level specified by the incremented level register 103. Because the instruction counter is the first entry of each level, adder 131 adds the number six to the stack pointer to access the next entry for this new level. Having addressed the correct stack entry, the name field of the instruction is used to locate the base address and length data in the name list 13 for writing into the stack 15 at the addressed entry. In our simplified example index counter 213 sequences through each entry in the name list to permit the name field of the instruction to be compared with each name in the name list. When a compare is detected by compare logic 215, the address space information including the program segment base address and length are gated through AND gates 217 to the program entry which is the second entry in stack 15 at this new level.

Figure 5:
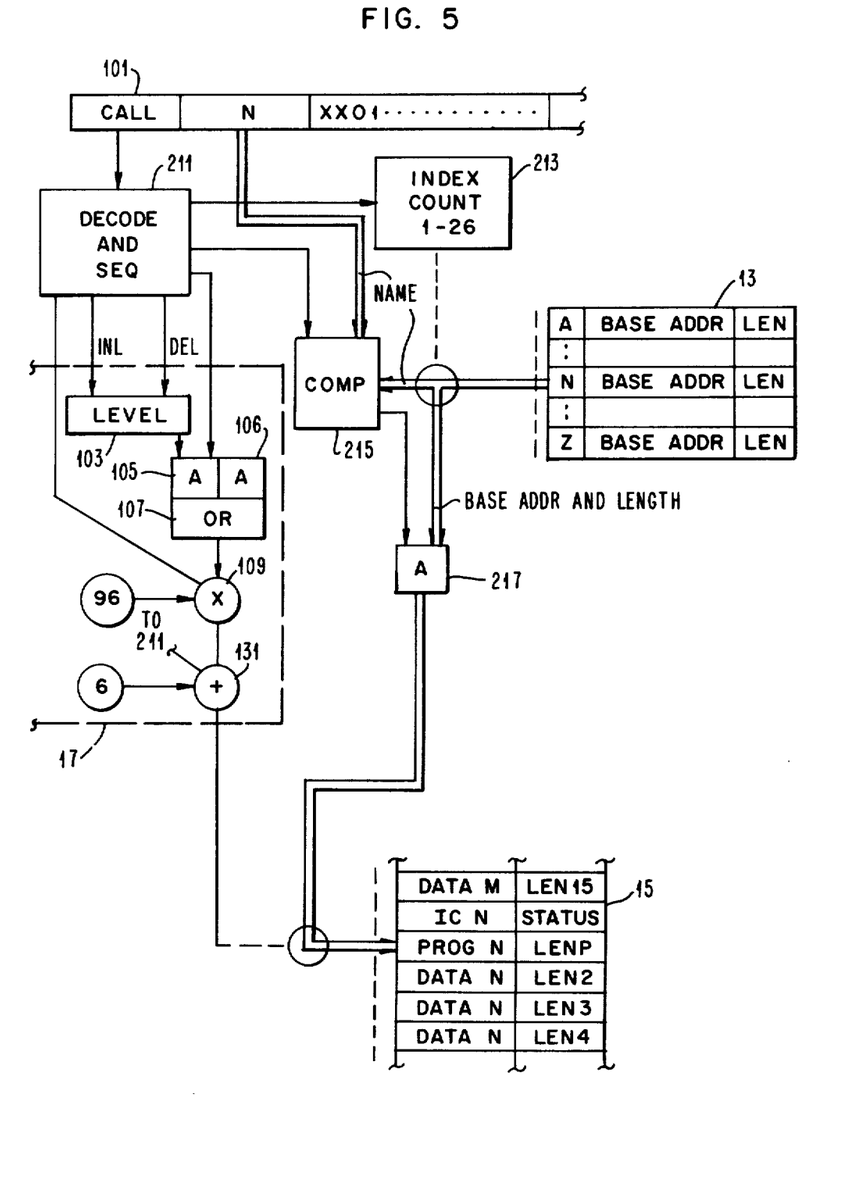
FIG. 5 shows a logic diagram of a first portion of the implementation of the call instruction interpreter.
Figure 6:
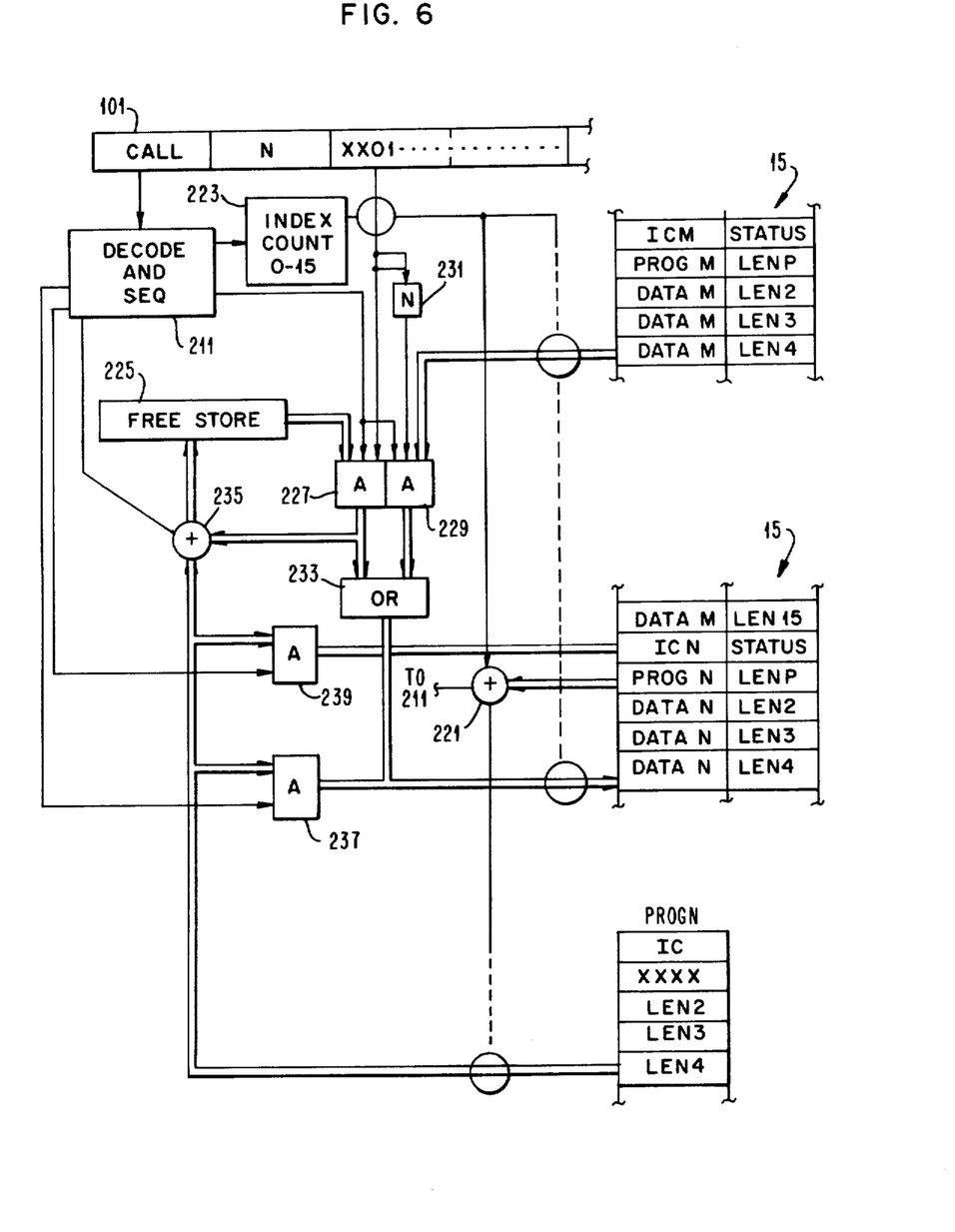
FIG. 6 is a logic diagram of the memory allocation portion of the call instruction interpreter.

Having written the program base address and length into the stack at the proper entry, this base address is used to access the first plurality of storage locations of the new program to retrieve such items as the execution entry instruction address and the length of each data address space required by the program. An explanation of a simple form of data address space allocation follows with reference being made to FIG. 6. As previously mentioned, the third and fourth bytes of the call instruction are the bit significant space allocation bytes. Data storage address space is allocated from free address space under control of index counter 223 and free storage start register 225. The content of free storage start register 225 is an address which was stored at the time all of the program address spaces or segments were allocated. This register simply contains the address of the first free storage location. Index counter 223 counts from zero through fifteen in this example, because there are sixteen entries in each stack level. Briefly, index counter 223 controls accessing of bits of the space allocation bytes in instruction register 101, controls incrementing access to stack entries and controls access to the first plurality of storage locations in the program to retrieve length values to be written into the stack. Using logic similar to that of FIGS. 3 and 5, the value in level register 103 is again multiplied by 96 to locate the first stack entry at the present level. 96 is also subtracted from the product to access corresponding entries in the previous level. The operation of the simplified storage allocation method of FIG. 6 operates as follows. When the index counter 223 has a count of zero, the entry point instruction count is gated through AND gates 239 to the first stack entry for the new level. When index counter 223 has a count of two, the third bit of the third byte in instruction register 101 controls AND gates 227, as well as AND gates 229 via inverter 231 to store the first data segment base address into the third entry of the stack level being set up. If the third bit is a binary one, AND gate 227 gates the content of free store start register 225 into the stack as the base address. At the same time, the length from the program segment is also stored in the stack by AND gate 237. Having copied the content of free store start register 225 to the stack, adder 233 adds the length of this new data segment to the previous content of free store start register 225 to obtain a new free store start address. If the third bit is a binary zero as in this case, inverter 231 connected to AND gate 229 moves the corresponding data segment base address and length used by program M to the third entry for program N, thereby permitting program N to use the same data segment as previously used by program M. In this way, programs M and N share the same data and avoid endangering other data without actually moving the data.

Referring back to FIG. 3, as the last step in executing the call instruction, the start of execution address for this new application program is retrieved from the first entry of the stack at the new level and passed through AND/OR gates 122, 123 as the address from which the next instruction is to be fetched. In this way, execution control is effectively passed from the calling program to the called program.

Figure 7:
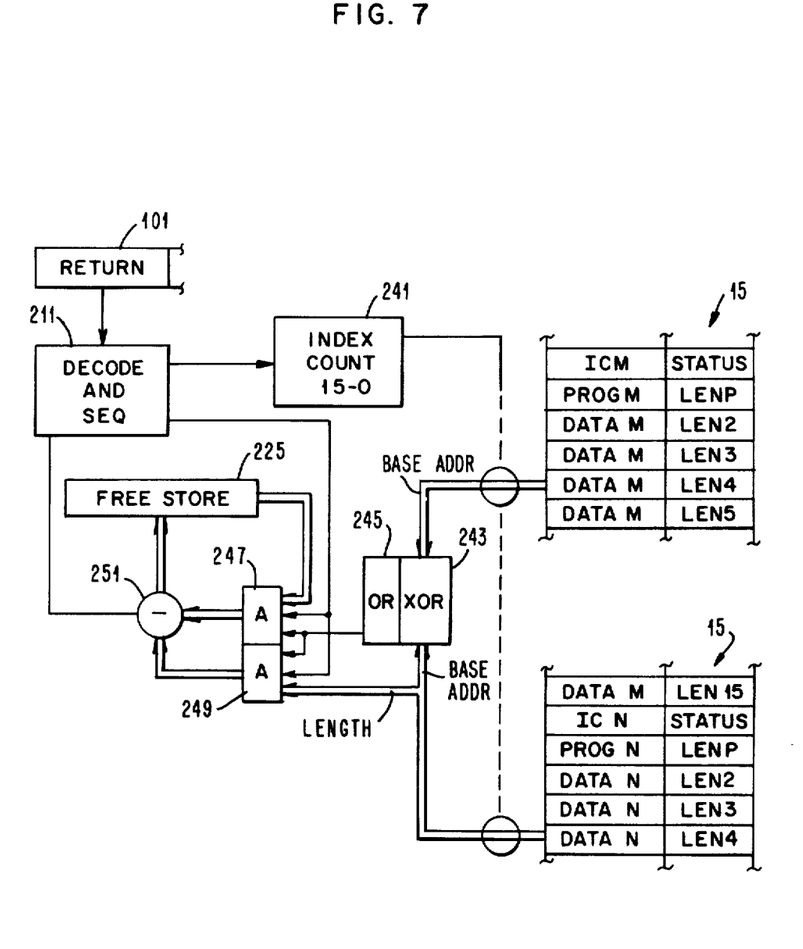
FIG. 7 is a logic diagram of the return instruction interpreter.

Referring now to the logic diagram of FIG. 7, the return instruction of the invention will be explained using the example logic of FIG. 7. The return instruction is a single byte instruction including only the opcode. The opcode is decoded and the sequence of execution is controlled by decode 211 to deallocate storage used by the called program and to return control to the calling program. Storage deallocation is accomplished by index counter 241 which in this case counts from fifteen to zero in the reverse of the process described above with respect to FIG. 6. Index counter 241 controls the access to corresponding base addresses of the called program and the calling program again as described with respect to FIG. 6. The corresponding base addresses are compared by exclusive OR 243 and OR gate 245 to provide a signal to AND gates 247, 249 in the event that these two addresses are not equal. If the two addresses are not equal, it means that the base address in the called program was allocated from free storage. Now that the called program is returning, the previously allocated data storage can be returned to free storage. This is accomplished in this very simple example by subtracting the length of the data storage address space being deallocated from the content of the free store start register 225 in subtracter 251. In the event that the base addresses of corresponding data spaces of the called and calling program are the same, the called program was using the same addresses previously allocated to the calling program and therefore they must not yet be freed. After storage has been deallocated, the count in level register 103 is decremented by the return instruction to return to, and continue execution of the calling program. The last step of the return instruction gates the instruction count now pointed to by the decremented level register through AND/OR gates 122, 123 of FIG. 3 to retrieve the next sequential instruction of the calling program M to continue execution of program M.

Figure 4:
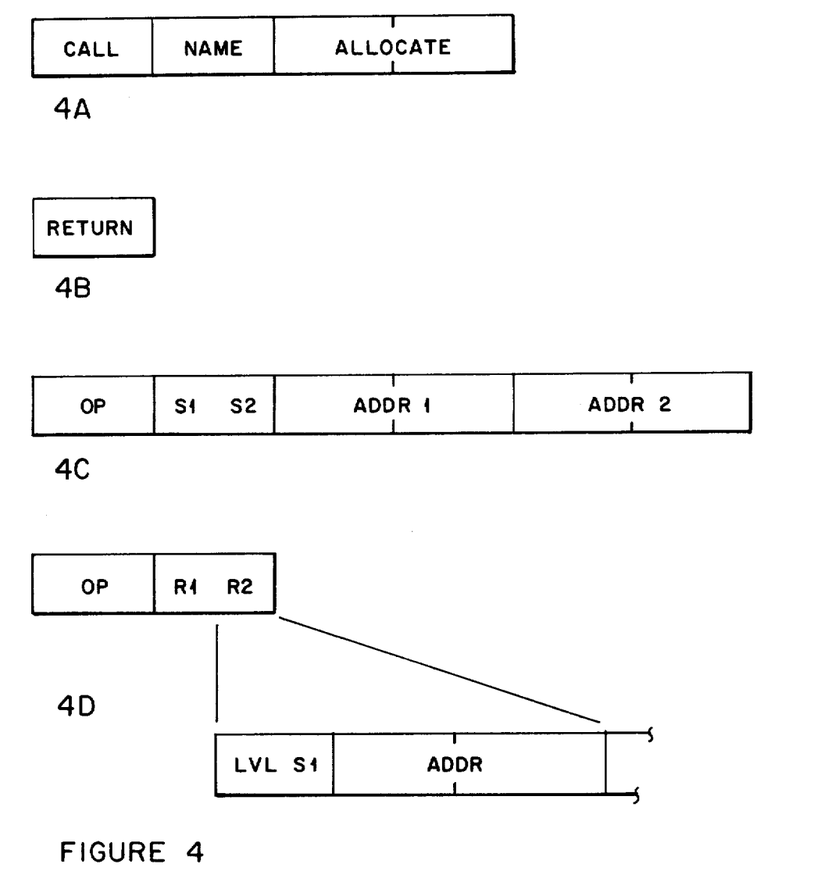
FIG. 4 shows example instruction formats for the preferred embodiments of the invention.

The instruction of FIG. 4D is an even further extension which can be advantageously implemented using the invention. In instruction 4D the opcode is again the first byte. The second byte specifies two registers. The second register however contains at least three bytes of address information which can be used to locate any address using information in the stack. The first byte of information stored in the second register contains two four bit numbers. The first number is the level number which is to be substituted for the level number stored in level register 103 shown in FIG. 3. The second four bit number of the first byte in the second register is again the segment number. The second and third bytes are again a 16 bit displacement.

Referring back to FIG. 3, with the content of register R2 stored in the second, third and fourth bytes of instruction register 101, it can be seen that AND gates 106 substitute the level field from register R2 for the content of level register 103. The instruction of FIG. 4D must not be used indescriminately because, like the instructions of the prior art, other programs or their data could be affected.

We claim:

1. The method of passing execution from a program in one logical address space to another program in a new logical address space comprising the steps of:
    storing a start address and length of the one logical address space and a program status word;
    creating the new logical address space by accessing a table to obtain a start address and length of the new logical address space;
    passing execution control to an instruction in the new logical address space;
    executing at least another instruction in the new logical address space;
    retrieving the start address and length of the one address space and the program status word; and
    passing execution control to the next sequential instruction in the one address space.

2. The method of claim 1 following the step of accessing, further comprising the steps of:
    accessing the new logical address space to retrieve a length value of a logical data address space to be used by the program in the new logical address space; and
    selectively allocating a new logical data address space having a length determined by the length value.

3. In a digital computer including means for executing an intersegment call instruction, the improvement comprising:
    opcode decoding logic for decoding the opcode portion of the instruction and controlling execution of the call instruction; and
    storage allocation logic controlled by said opcode decoding logic and responsive to the content of a storage allocation field in the call instruction for allocating a new data segment to a called program and alternately for allocating to the called program a data segment which has also been allocated to the calling program.

4. The digital computer of claim 3 wherein the storage allocation logic further comprises:
    logic responsive to a new length value stored as part of the called program to control the storage allocation logic to allocate only so much storage, as specified by the length value, to the called program when a new data segment is allocated by the storage allocation logic.

5. The digital computer of claim 4 wherein the storage allocation logic further comprises:
    logic responsive to an old length value of a data segment of the calling program for limiting the length of the data segment of the calling program as allocated to the called program to be not greater than the old length value.

* * * * *